Oct. 9, 1962   J. G. JOHNSON   3,057,428
TRACTOR

Filed July 28, 1959   3 Sheets—Sheet 1

INVENTOR.
J. G. JOHNSON

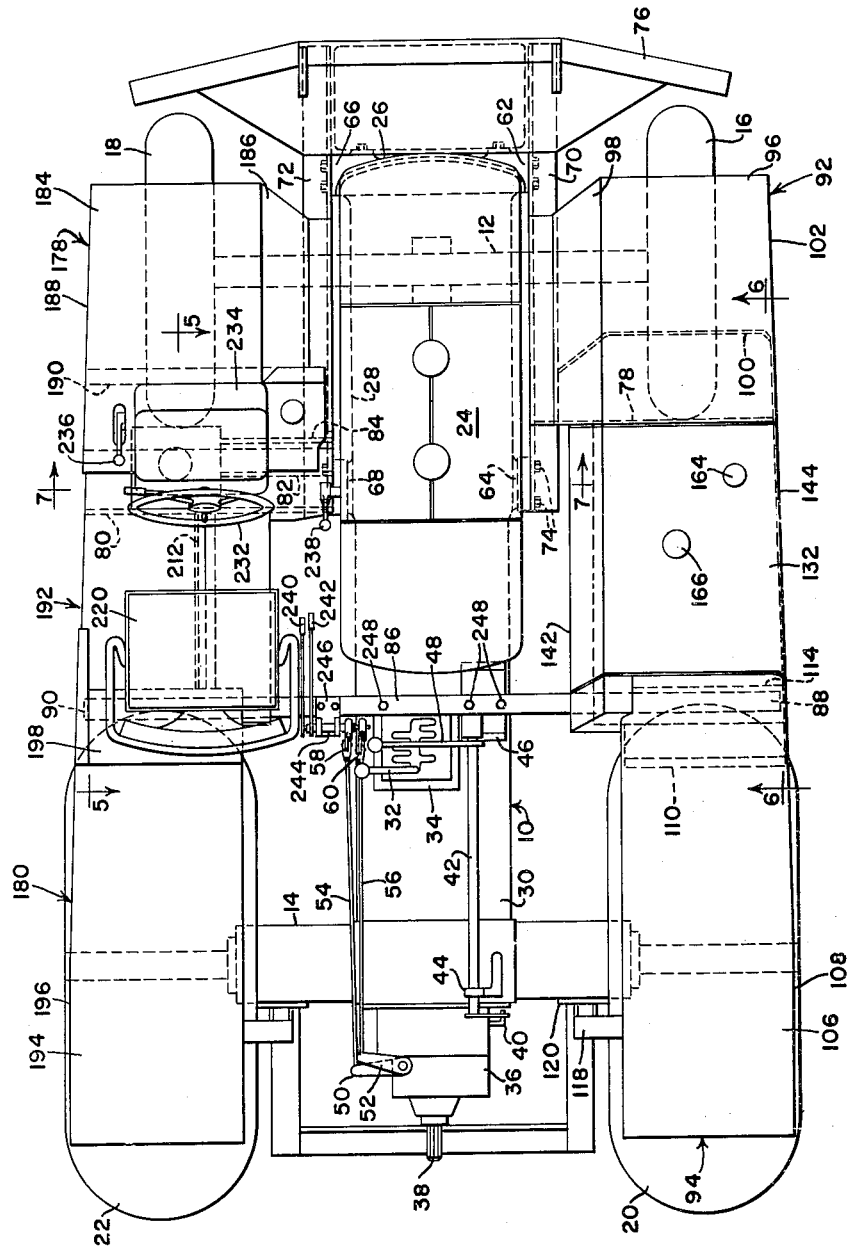

Oct. 9, 1962   J. G. JOHNSON   3,057,428
TRACTOR
Filed July 28, 1959   3 Sheets-Sheet 3
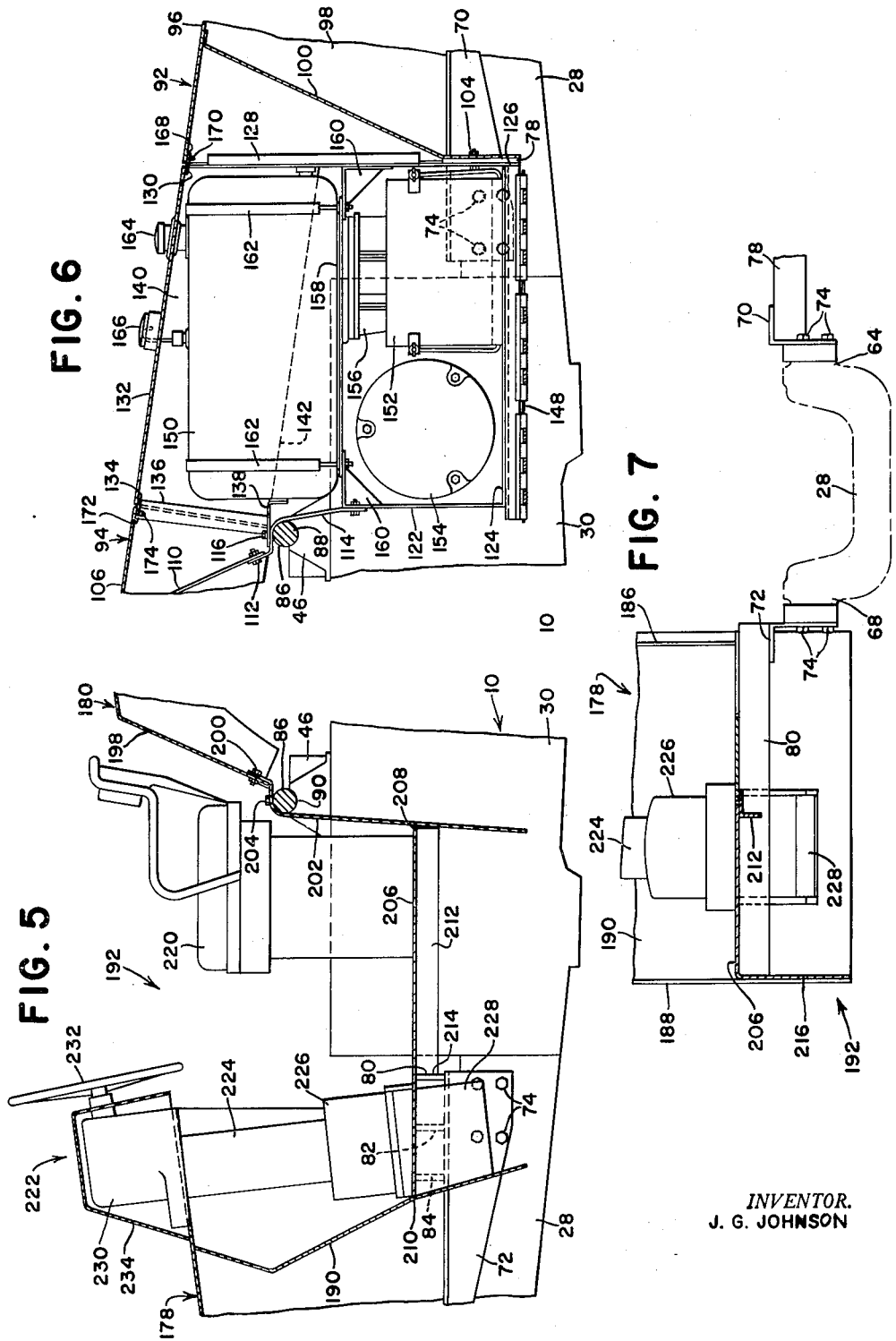
INVENTOR.
J. G. JOHNSON

United States Patent Office 3,057,428
Patented Oct. 9, 1962

1

3,057,428
TRACTOR
John G. Johnson, Waterloo, Iowa, assignor to Deere & Company, Moline, Ill., a corporation of Delaware
Filed July 28, 1959, Ser. No. 830,024
5 Claims. (Cl. 180—69)

This invention relates to a tractor adapted for use with specialized equipment in which the tractor is essentially a draft vehicle modified from the status of a conventional tractor so as to adapt itself to the use of such specialized equipment as rear-mounted earth moving equipment.

Accordingly, the principal object of the present invention is to provide a tractor construction in which a basic tractor can be modified along the lines indicated. Specifically, this object is achieved by the provision of support and fender structure so arranged as to position the operator amidship but in lateral offset relationship to the tractor body, thus affording room at the rear of the tractor for the mounting of equipment of the semi-trailer type. Another feature of the arrangement resides in the provision at the opposite side of the tractor of similar fender structure but in which the space between the fenders is utilized in the form of a compartment for housing the fuel tank, for example, and other components of the tractor normally disposed at the rear but the position of which must be changed because of the special circumstances already noted. The invention features an arrangement whereby a basic tractor may be simply and inexpensively converted for the purposes stated above. Subsidiary features reside in the provision of novel supporting structure whereby components for the normally centrally and rearwardly located operator's station are adapted to the new location of the operator's station in its amidship but laterally offset relation.

The foregoing and other important and desirable objects inherent in and encompassed by the invention will become apparent as a preferred embodiment thereof is disclosed in detail, by way of example, in the ensuing description and accompanying sheets of drawings, the several figures of which are described immediately below.

FIG. 4 is an enlarged plan of the tractor.

FIG. 5 is a section on the line 5—5 of FIG. 4 on a somewhat enlarged scale.

FIG. 6 is a section on the line 6—6 of FIG. 4 on a somewhat enlarged scale.

FIG. 7 is a fragmentary section substantially along the line 7—7 of FIG. 4, and also on a somewhat enlarged scale.

Figure 1:
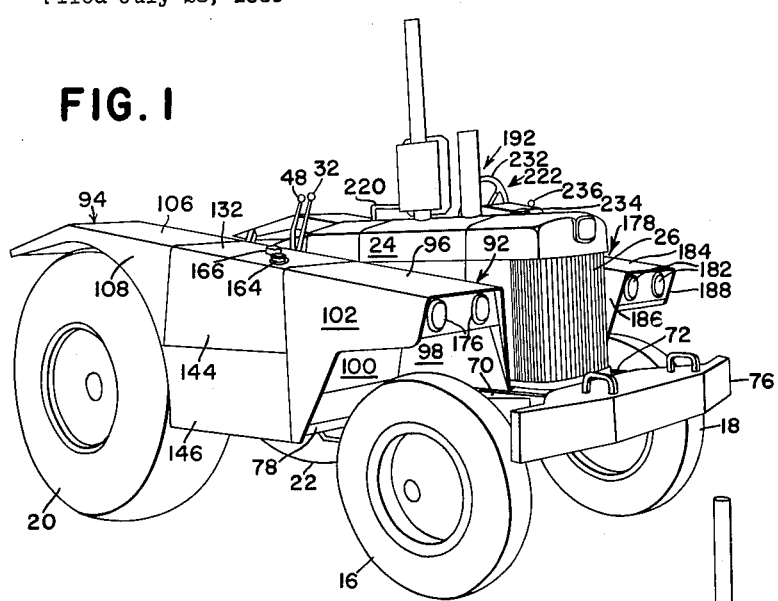
FIG. 1 is a perspective of the tractor as seen from one side.
Figure 2:
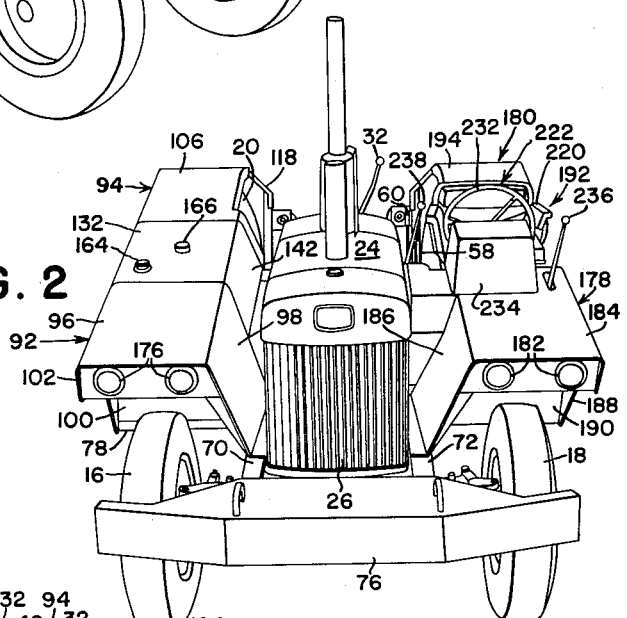
FIG. 2 is a perspective of the tractor as seen from the front and slightly above.
Figure 3:
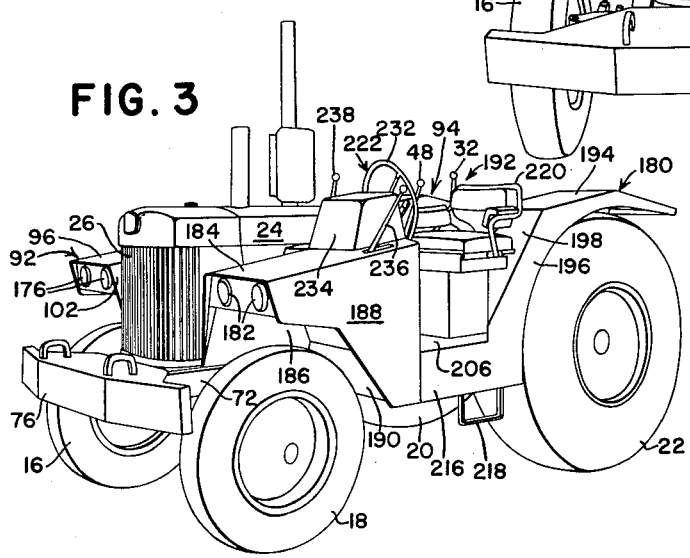
FIG. 3 is a perspective of the tractor as seen from the side opposite to that shown in FIG. 1.

The tractor comprises an elongated fore and aft main body 10 having transverse front and rear axles 12 and 14, respectively. Opposite ends of the front axles carry right and left front wheels 16 and 18, these being laterally spaced apart so that the forward portion of the main body 10 is substantially centrally disposed between the wheels. Opposite ends of the axle structure 14 carry right and left traction wheels 20 and 22, these likewise being laterally spaced apart and generally tracking with the respective front wheels 16 and 18.

The forward part of the body carries an internal combustion engine, for example (not shown) which is enclosed in a typical engine hood structure 24 supplemented at its forward end by a frontal grille 26. To this extent, the tractor follows generally conventional construction, and the main body is made up of a forward

2 part 28, for supporting the engine (not shown) and a rearward part 30, for housing the transmission and final drive (not shown), which may be of any conventional construction not material here. The several speeds of the transmission may be selected by a control member in the form of a shift lever 32 associated with a centrally mounted selector plate 34 which includes slotted portions commensurate with the shift pattern of the particular transmission. Details of this character are not material, except so far as they are related to other structural components to be later described.

The rear end of the body 10 is provided with auxiliary housing structure 36 from which a shaft 38 projects rearwardly. This shaft is representative of the typical power take-off shaft found in tractors of this character. Within the housing, and not shown here because not material in detail, is means for engaging and disengaging the power take-off shaft. This is accomplished from outside the housing by suitable linkage, as at 40, operated from a fore and aft extending rockshaft 42 journaled adjacent its rear end in a bracket or bearing 44 and adjacent its front end in a bearing or bracket 46. A control member in the form of a lever 48 is fixed to a forward portion of the rockshaft 42 for rocking same to engage and disengage the drive to the power take-off shaft 38. The driving mechanism within the housing 36, for the power take-off shaft 38, may be of the type shown in the U.S. patent to Fletcher et al. 2,725,963; although, as already indicated these details can be varied at will without affecting the basic aspects of the invention.

The housing 36 is here shown as also including an enclosed hydraulic power system of the dual-function type, representative of which is that forming the subject of the U.S. patent to Harris et al. 2,871,963, one characteristic of which is its inclusion of two control valves capable of independent operation and accordingly provided with two operating rockshafts, each of which has its own lever. The two levers are represented here at 50 and 52, but here again the internal details may vary and the only importance of the disclosure in the present case is in connection with the overall arrangement whereby the levers 50 and 52 can be controlled from a portion of the vehicle remote from the rear housing 36. For example, the levers 50 and 52 are connected respectively by forwardly extending links 54 and 56 to control levers 58 and 60 located amidship as respects the length of the main body 10. As will be understood by those versed in the art, the power take-off shaft 38 is used for driving allied equipment, and the hydraulic power system is utilized for transmitting hydraulic power to similar equipment, which, in the case of earth-moving machinery, has several parts that must be positioned or adjusted according to the types of operations being performed. Here again, the basic tractor characteristics are retained but, as will be brought out below, are coordinated with the novel structure in converting the tractor from a conventional design to the novel modified design.

In a typical tractor, the forward part is usually provided with mounting pads for the purpose of mounting associated implements. Even apart from the provision of such pads, implements are conventionally mounted on the tractor by auxiliary support means. In the present case, the forward part 28 of the main body 10 has at its right side front and rear mounting pads 62 and 64, and similar front and rear mounting pads 66 and 68 are provided at the left hand side of the forward part 28. These pads serve to rigidly carry right and left fore and aft frame members 70 and 72 respectively, suitable cap screws, as at 74, being utilized for the purpose of attachment. The members 70 and 72 may be extended to carry a transverse front bumper 76.

The frame members 70 and 72 represent part of what may be regarded as front support means. To this end, the frame member 70 has rigidly secured thereto a laterally projecting member in the form of a rigid outrigger 78, and a somewhat similar outrigger 80 is provided as a rigid outwardly extending part of the frame member 72. For purposes to presently appear, additional outriggers 82 and 84 are provided as rigid parts of the member 72. Rear support means in the form of a single transverse support, preferably a round solid bar 86 is carried by a rear portion of the tractor, generally amidships thereof, and having right and left outer ends 88 and 90 respectively which lie respectively closely ahead of the right and left traction wheels 20 and 22. The outrigger 78 at the right side of the tractor lies closely behind the proximate right hand front wheel 16, and thus the support portions represented at 78 and 88 are spaced apart fore and aft. A similar relationship exists between support portions provided at 90 and 80, 82, 84 at the left side of the tractor.

The space thus defined between the support portions 78 and 88 is further augmented by right hand front and rear fenders designated in their respective entireties by the numerals 92 and 94. The front fender is carried by the outrigger 78 and is associated fore and aft frame member 70 and is of such design as to make this possible, having a top wall 96, an inner side wall 98 and a rear wall 100 and an outer side wall or sheet 102. The inner wall 98 is rigidly secured in any suitable manner to the associated fore and aft frame member 70, and the lower portion of the rear transverse wall 100 is mounted in any suitable manner on the outrigger 78, as best shown in FIG. 6, wherein a bolt is shown at 104 as representative of appropriate fastening means.

The rear fender 94 is made up of a plurality of walls, including a top wall 106, an outer wall 108 and a front wall 110. The front wall 110 is rigidly secured, as by bolt 112 to a sheet-like bracket 114 which is in turn bolted at 116 to the outer end 88 of the transverse support bar 86 (FIG. 6). The bracket 114, being in the form of a sheet, may be considered a forward and downward extension of the fender wall 110. Thus regarded, it will be seen that the front part of the rear fender 94 is rigidly supported by the extension or end 88 of the support bar 86. A rear part of the fender 94 is supported by a brace 118 fastened to the proximate side of the rear axle 14 by a suitable bracket 120.

The front wall as constituted by the sheet or wall portions 110 and 114 may further be regarded as having a downward extension in the form of a transverse upright wall 122 which may be secured to or formed as a part of a fore and aft floor 124 which extends forwardly to a portion 126 rigidly joined to the outrigger 78 by the previously described means 104. The portion 126 may be extended upwardly by appropriate straps as at 128, the upper portions of which are rigidly secured, as by welding at 130 to a top wall 132 which extends between or bridges the space between the terminal rear edge of the front fender top 96 and the terminal front edge of the rear fender top 106. The rear part of the top wall 132 may have welded thereto at 134 a depending brace 136 which is rigidly secured at its lower end to a bracket 138 which is secured to the outer end 88 of the bar 86 by the previously described bolts 116.

The top wall 132, together with the previously described wall and floor portions 100, 110—114—122 and 124 afford means providing a compartment means 140 generally in transverse alinement with but offset laterally to the right of the amidships portions of the main body 10. The compartment-forming means, represented by the walls and floor just referred to, is augmented by an inner wall 142, preferably formed integral with the top wall 132, and an outer wall 144, likewise preferably formed integral with the top wall 132. The wall 144 is preferably made in two parts, the lower part 146 of which is removable to afford access to the lower part of the compartment means 140. For this purpose, as best shown in FIG. 6 the wall part 146 may be in the form of a door hinged at 148 to the floor 124 and secured in position by any suitable means, not important here. In the preferred embodiment as presented by the present disclosure, the compartment means 140 houses, in an upper part thereof, a fuel tank 150 and, in a lower part thereof, a plurality of storage batteries 152. As best seen in FIG. 6, the lower terminal edge of the inner wall 142 lies above the lower part of the compartment means 140, and thus exposes instrumentalities of the tractor, here represented by the drive housing 154 and fuel filters 156, access to which may be had by opening the door or wall part 146. In the conventional tractor, such components as fuel tank 150 and storage batteries 152 are located elsewhere, normally centrally of the tractor, with the storage batteries lying either amidships or at the rear portion of the tractor. In the present case, the rear portion of the tractor is desired for other purposes, and the compartment means 140, afforded by the related wall elements as described, provides a suitable area for housing these components. The compartmentation at 140, because of the housing of the two components 150 and 152, includes an intermediate floor or support 158 supported at 160 at its front and rear ends by the related structure as shown in FIG. 6. The intermediate floor additionally provides means whereby the fuel tank may be strapped thereto as at 162. A filler neck for the fuel tank is shown at 164 and a vent is indicated at 166.

The front fender 92 is removably mounted by means of the parts 70 and 78 and additionally by means at the forward terminal edge of the intermediate top wall 132. For this purpose, the terminal forward edge has a mounting lug 168, welded thereto by the previously described weld 130. This lug is apertured to receive a pin 170 carried by the rear terminal edge of the top 96 of the fender 92. There may be several of the lugs 168 and pins 170 so that the connection of the fender may be made first by inserting the pins 170 through the apertured lugs 168 and subsequently bolting the lower portions thereof to the support parts 78 and 70. A similar arrangement is provided for the rear fender in the form of rear lugs 172 on the wall 132 and pins 174 on the forward terminal edge of the top 106 of the rear fender 94.

It is another characteristic of the fender and compartmentation structure that the whole is related in such fashion as to enhance the appearance of the tractor. As will be seen, the tops 96 and 106 of the fenders 92 and 94 are coplanar in a downwardly and forwardly inclined plane. Likewise, the top wall 132 lies in this plane. In addition, the side sheets or outer portions afforded by the sides 102 and 108 of the front and rear fenders are coplanar with the outer wall and door 144—146 of the compartmentation structure. The forward portion of the front fender 92 may be provided with dual headlights 176.

A further part of the tractor structure includes right and left hand front and rear fenders 178 and 180. These are generally symmetrical counterparts of the right hand front and rear fenders 92 and 94 respectively, with slight modifications as will be pointed out. The forward part of the left hand front fender 178 carries a pair of dual headlights 182 and has a top 184, an inner side wall 186 and an outer side wall or side sheet 188. The inner wall 186 is joined, in any suitable manner, to the left hand fore and aft frame member 72 and the rear part of the fender is carried by the outrigger 84 in a manner to be presently described. For this purpose, the rear part of the fender carries what may be regarded as an interior rear wall 190 which forms additionally a dashed delineating the forward part of an operator's station which is indicated in its entirety by the numeral 192. The details of the operator's station will be treated subsequently.

The rear fender 180 has a top 194, an outer side sheet or wall 196 and a forwardly and downwardly sloping front wall 198. As best shown in FIG. 5, the lower portion of the front wall 198 of the fender 180 is rigidly secured, as by bolting at 200 a bracket sheet 202 which in turn is bolted to the left hand end 90 of the transverse support bar 86. Bolts, as at 204, may be used for this purpose. The sheet 202 extends downwardly closely ahead of the left hand rear wheel 22 and therefore lies in rearwardly spaced relation to the rear wall 190 of the front fender 178. Part of the operator's station 192 includes a fore and aft horizontal platform 206, rigidly joined, as by welding at 208 and 210 respectively, to the front and rear walls just referred to. Additionally, the platform may be braced by one or more fore and aft angles at 212. The forward portion of the floor or platform 206 overlies and may be welded to the outriggers 80, 82 and 84. In addition, the angle 212 may be welded to the rear outrigger as at 214. The outer edge portion of the platform 206 is bent downwardly as an upright fore and aft side sheet 216 and a mounting step 218 is added in any suitable manner to facilitate access to the operator's platform from the ground.

The platform structure includes and supports an operator's seat 220 in any appropriate manner, it being noted that this seat is closely convenient to control levers previously described at 32, 48, 58 and 60.

The seat is also closely convenient to a steering control means indicated in its entirety by the numeral 222. In this case, the steering may be of any suitable power type, preferably hydraulic, involving at least some of the characteristics of these disclosed in the U.S. patent to Worthington 2,762,446; although, this is not a limitation on the present invention. Suffice it to note that the steering control involves basically a standard or pedestal 224 having a lower housing part 226 rigidly mounted on and supported by a forward portion of the operator's station structure 192. In this instance, the housing 226 includes a depending supporting portion 228 passing through a suitable aperture in a forward portion of the floor 206 and welded to the outriggers 82 and 84 and to the depending portion of the front wall 190 of the fender structure 178. This will be clear from FIGS. 5 and 7 without further elaboration. The upper portion of the pedestal 224 includes an upper housing 230 which may contain an appropriate valve (not shown) under control of a steering wheel 232. Sheet metal styling at 234 covers the housing 230 and may be regarded as a rearward and upward continuation of the left hand front fender structure 178; although, it is removable for access to the steering mechanism housing.

Additional control levers 236 and 238 are mounted in convenient proximity to the operator's seat 220, as are a pair of levers 240 and 242 which are mounted on a rockshaft 244 which is in turn connected to the previously referred to levers 58 and 60. The rockshaft 244 may be carried in a suitable bearing 246 mounted on a cross pipe 86. The cross pipe is adequately supported by means of the bearing 46 and the shift pattern plate 34, previously referred to, cap screws being shown at 248 for the purpose of mounting the cross pipe.

From the foregoing description, it will be seen that the overall inventive structure enables the utilization of a conventional tractor chassis for a tractor of somewhat special design, inasmuch as the operator's station normally located to the rear of the engine hood and grille structure is located at one side of the tractor in what may be regarded as balanced relationship with the fender and compartmentation structure 92—132—94. The latter structure also accommodates components normally mounted elsewhere. This leaves the rear portion of the tractor available in the area between the rear fenders 94 and 180 and rearwardly of the cross pipe 86. At the same time, all the conventional controls are conveniently grouped for easy access by an operator on the operator's station 192. The left and right hand structures may be designed, as shown here, in the form of separate components which may be mounted on and dismounted from the tractor.

Features and characteristics other than those enumerated herein will readily occur to those versed in the art, as will many modifications and alterations in the preferred embodiment of the invention, all of which may be achieved without departure from the spirit and scope of the invention.

What is claimed is:

1. A tractor, comprising: a fore-and-aft main body; right and left steerable front wheels spaced apart transversely and carrying the front end of the body between them; right and left rear wheels spaced apart transversely and carrying the rear end of the body between them; front support means rigidly carried by a forward portion of the body and including rigid right and left lateral outrigger members projecting respectively outwardly respectively closely rearwardly of the right and left front wheels; fore-and-aft engine hood structure on the body between the front wheels and including a fore part at the front end of the body and a rear part generally amidship of said body; rear support means rigidly carried by the body and including right and left lateral outer parts extending outwardly from the body respectively closely ahead of the right and left rear wheels so as to be spaced respectively rearwardly from the right and left outrigger members; right and left front fenders respectively over the right and left front wheels and carried by the body respectively at least in part by the outrigger members; right and left rear fenders respectively over the right and left rear wheels and carried at least in part respectively by the right and left outer parts of the support means, said front and rear fenders being spaced apart fore-and-aft so as to provide right and left spaces respectively flanking and generally in transverse alinement with said rear part of said structure, each front fender having a top overlying the associated front wheel and a depending rear portion defining the front of the associated space and each rear fender having a top overlying the associated rear wheel and a depending front portion defining the rear of the associated space; means in one space affording an operator's station supported between the proximate front and rear fenders at that side, including a platform at a level below that of the tops of the fenders and bridging the associated depending fender portions, a seat on the platform adjacent to the depending portion of the associated rear fender, and steering means for the front wheels and including a steering wheel mounted at the top of the associated front fender; a fuel tank received in the space at the other side of the body; and sheet structure extending between the front and rear fenders at said other side of the body and having top and side portions enclosing the fuel tank.

2. A tractor, comprising: a fore-and-aft main body having front and rear ends and including a fore-and-aft engine hood structure provided with a fore part at the front end of the body and a rear part generally amidship of the body; right and left front wheels spaced apart transversely and carrying the front end of the body between them; right and left rear wheels spaced apart transversely and carrying the rear end of the body between them; right and left front fenders respectively over the right and left front wheels and carried by the body; right and left rear fenders respectively over the right and left rear wheels and carried by the body, said front and rear fenders respectively including rear and front generally upright portions spaced apart fore-and-aft so as to provide right and left spaces generally in transverse alinement with and flanking the rear part of said structure; means in one space affording an operator's station supported between the proximate front and rear fender portions at that side; sheet structure extending between the front and rear fender portions at the other side of the body and closing the space at said other side to form a compartment; a tractor accessory in said compartment; and a transverse support immediately to the rear of the rear part of said structure and rigidly secured thereat to the body and having opposite lateral outer ends respectively supporting the rear fenders, one of said outer ends serving at least in part to support the operator's station and the other of said outer ends serving at least in part to support said accessory.

3. The invention defined in claim 2, in which: a portion of said sheet structure is removable to provide access to the associated space and said accessory.

4. The invention defined in claim 2, in which: the compartment includes a partition dividing said compartment into first and second subcompartments, the first of which contains the aforesaid accessory, and a second accessory is received in the second subcompartment.

5. A tractor, comprising: a fore-and-aft main body; right and left steerable front wheels spaced apart transversely and carrying the front end of the body between them; right and left rear wheels spaced apart transversely and carrying the rear end of the body between them; fore-and-aft engine hood structure on the body between the front wheels and including a fore part at the front end of the body and a rear part generally amidship of said body; right and left front and rear fenders respectively over the right and left rear wheels and carried by the body, said front and rear fenders at each side of the body being spaced apart fore-and-aft so as to provide right and left spaces respectively flanking and generally in transverse alinement with said rear part of said structure, each front fender having a top overlying the associated front wheel and a depending rear portion defining the front of the associated space and each rear fender having a top overlying the associated rear wheel and a depending front portion defining the rear of the associated space; means in one space affording an operator's station supported between the proximate front and rear fenders at that side, including a platform at a level below that of the tops of the fenders and bridging the associated depending fender portions, a seat on the platform adjacent to the depending portion of the associated rear fender, and steering means for the front wheels and including a steering wheel mounted on the top of the associated front fender; a tractor accessory received in the space at the other side of the body; a rigid outrigger member projecting laterally outwardly therefrom beneath and sustaining the platform; a steering wheel support behind the associated front fender depending portion and rigidly mounted on and rising from said outrigger member and supporting the steering wheel; and sheet structure extending between the front and rear fenders at said other side of the body and having top and side portions enclosing the accessory.

References Cited in the file of this patent
UNITED STATES PATENTS

| | | |
|---|---|---|
| D. 146,238 | Smart | Jan. 14, 1947 |
| D. 188,456 | Dreyfuss et al. | July 26, 1960 |
| 1,972,224 | Herman | Sept. 4, 1934 |
| 2,253,438 | Lutz | Aug. 19, 1941 |
| 2,711,341 | Mills | June 21, 1955 |
| 2,845,133 | Norrie et al. | July 29, 1958 |
| 2,923,268 | Fletcher et al. | Feb. 2, 1960 |
| 2,946,598 | Foster | July 26, 1960 |